United States Patent [19]

Riddy

[11] 3,964,755

[45] June 22, 1976

[54] LIQUID FUEL SUPPLY SYSTEMS

[76] Inventor: Frederick Thomas Riddy, 187 Marsh Lane, Erdington, Birmingham 23, Warwickshire, England

[22] Filed: Dec. 26, 1974

[21] Appl. No.: 536,618

[30] Foreign Application Priority Data
Jan. 17, 1974 United Kingdom.............. 2321/74

[52] U.S. Cl.............................. 280/5 A; 137/592; 222/167
[51] Int. Cl.²........................................ B65D 25/00
[58] Field of Search ............ 280/5 A; 222/167, 375; 137/588, 592, 590

[56] References Cited
UNITED STATES PATENTS

| | | | |
|---|---|---|---|
| 2,771,944 | 11/1956 | Thonburg ...................... | 137/592 X |
| 3,083,873 | 8/1963 | Hirsekorn ...................... | 222/167 X |
| 3,390,698 | 7/1968 | Carmichael et al............. | 137/590 X |
| 3,699,995 | 10/1972 | Brandt............................ | 137/588 X |

FOREIGN PATENTS OR APPLICATIONS 147,894    11/1954    Sweden.............................. 222/167

*Primary Examiner*—Philip Goodman
*Assistant Examiner*—John A. Pekar
*Attorney, Agent, or Firm*—Norris & Bateman

[57] ABSTRACT

Reserve fuel tank for motor vehicles and the like includes an air-tight reservoir having inlet and outlet tubes so that it can be connected between the main fuel tank and the engine or other fuel consumer. In a main feed position the outlet opens from an upper region and the reservoir is automatically filled with fuel by the flow from the inlet, and preferably said flow impinges on the outlet so that some fuel passes straight through. In a reserve feed position structure of the device is rearranged so that the outlet opens from a lower region to draw fuel from the reservoir, for example by inverting the reservoir, or inverting or lowering an outlet tube or a combined outlet and inlet tube. A simple and cheap construction is provided, avoiding the need for valves or cocks.

10 Claims, 4 Drawing Figures

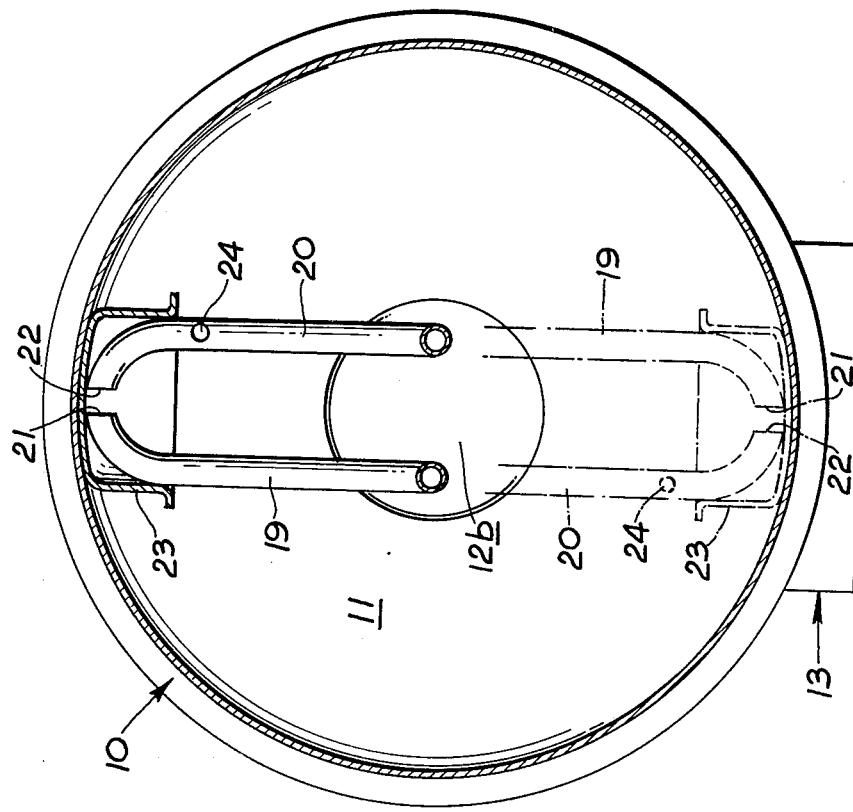
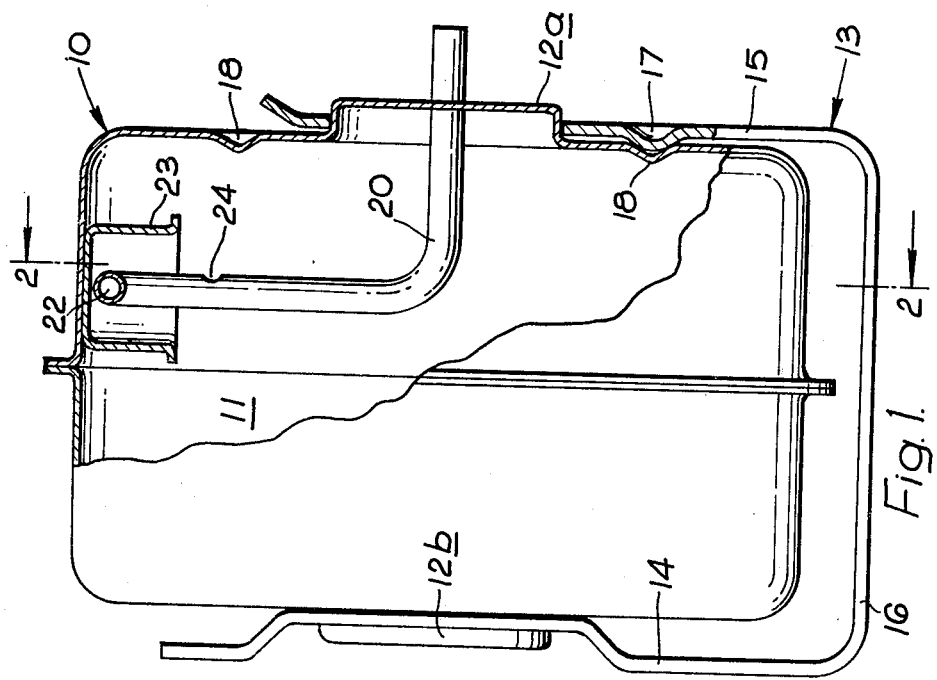

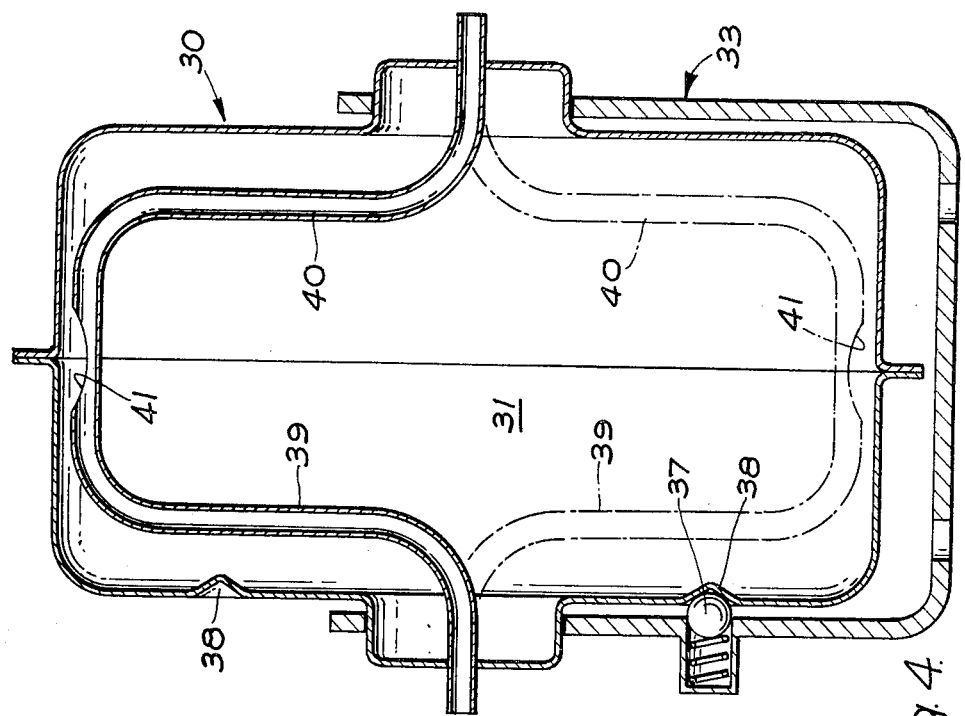
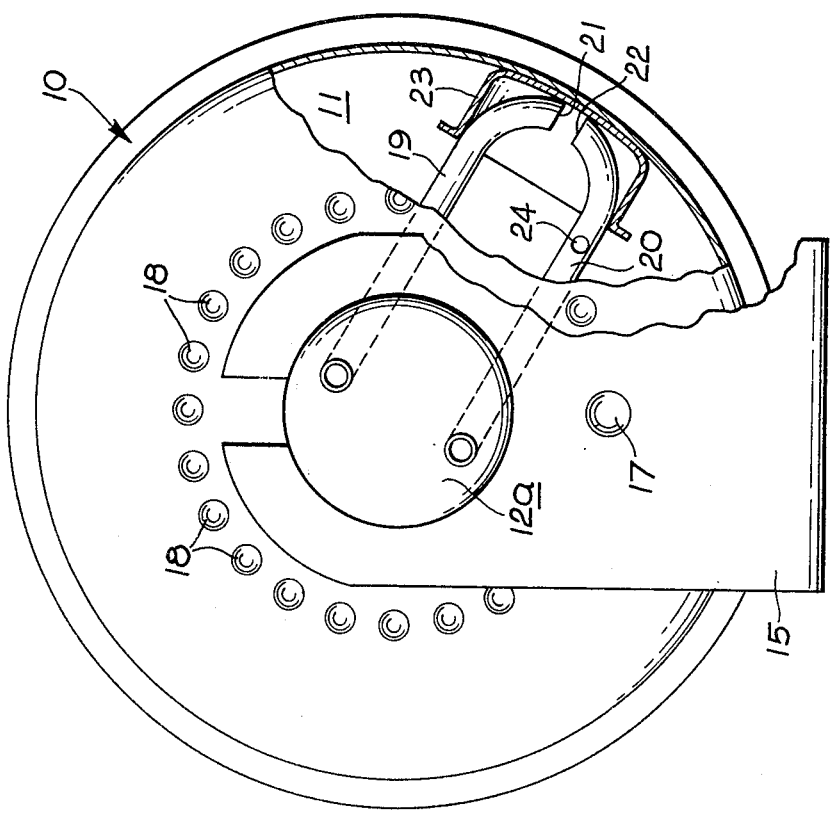

LIQUID FUEL SUPPLY SYSTEMS

This invention relates to the provision in liquid fuel supply systems of a reserve or auxiliary store of fuel which can be resorted to in an emergency should a main supply become exhausted. The invention may be used in any liquid fuel system feeding an engine, heating installation or other fuel consuming device but has particular but not exclusive reference to fuel systems of motor vehicles and boats.

The object of the invention is to provide an auxiliary fuel supply device which is particularly simple in construction, convenient to install and operate; and which may readily be used in liquid fuel systems of all types, either built in at the time of manufacture or as a modification of an existing system.

According to the invention there is provided an auxiliary fuel supply device comprising structure defining a reservoir with an inlet and an outlet for forming an operatively enclosed connection leading from a main fuel supply to a fuel consuming device by way of the reservoir in use, and means permitting selective movement of at least part of said structure between a main feed position at which the outlet opens from an upper region of the reservoir and a reserve feed position at which said outlet opens from a lower region thereof.

Preferably the inlet and outlet are in predetermined spaced alignment, at least while said part of the structure is at the main feed position, so that in use part of a flow of fuel leaving the inlet impinges on the outlet so as to pass to the fuel consuming device, while a remaining part of said flow is filling the reservoir.

The inlet and outlet may be constituted by a common aperture open to the reservoir; and the mounting means may support the entire reservoir for rotation about between an upright position for main feed and a wholly or partly inverted position for reserve feed.

Preferred embodiments of the invention, with certain modifications thereof, are now more particularly described with reference to the accompanying drawings wherein:

FIG. 1 is a side elevation, part sectioned, of a first auxiliary fuel supply device, FIG. 2 is a section on line 2—2 of FIG. 1, FIG. 3 is an end elevation, part sectioned and showing the device at an intermediate reserve position, and FIG. 4 is a vertical section of a second form of the device.

Referring firstly to FIGS. 1–3, the device comprises a cylindrical drum 10 defining a reservoir 11 and formed from a pair of flanged cup-shaped metal pressings having bosses 12a, 12b in their end faces. A U-shaped bracket 13 supports drum 10 for rotation about its axis, said bracket having resilient parallel limbs 14, 15 with apertures in which the bosses are journalled.

Limb 14 is cranked inwardly in the region of boss 12b to leave a clear outer face which can be attached to a convenient vertical or near-vertical mounting surface; or bracket 13 can have its base 16 attached to a mounting surface at any angle in either case so that the drum is rotatable about a horizontal or near-horizontal axis.

Limb 15 includes an inwardly directed pip 17 which snap engages with any one of a ring of dimples 18 surrounding boss 12a in the end of drum 10 so that the drum can be retained at any angular position relative to bracket 13.

Inlet and outlet tubes 19, 20 pass through boss 12a and extend to the drum periphery within reservoir 11 where they terminate in end parts curved towards each other to provide inlet and outlet openings 21, 22 facing each other in aligned but spaced relationship. Said end parts are located in a cup-shaped weir 23 attached inside the drum periphery whose main purpose will be described hereinafter but which also serves to maintain said aligned relationship during and after assembly.

Outlet tube 20 has a small hole 24, forming a warning aperture in its wall within reservoir 11 positioned at above five-eighths of the radius of drum 10 from the axis of the latter.

In use, for example in a motor vehicle fuel system, the fuel line leading from the main tank is connected to inlet tube 19, and outlet tube 20 is connected to the line leading to the engine, flexible connections being used to allow for 180° angular movement of the drum. The device will operate whether it is on the suction or outlet side of a fuel pump (mechanical or electrical) because the drum is air-tight, thus it can be mounted at any convenient location. It will also operate in a gravity-fed system provided the drum is below the level of the main tank and above the engine.

For normal operation the drum is aligned with openings 21, 22 uppermost as shown in full lines in FIG. 2. Part of a flow of fuel passing from tube 19 under pressure or suction will impinge on outlet 22 and pass straight on through tube 20, while a remaining part will be retained in reservoir 11 until it is filled, displacing air through the outlet, thus the engine will operate while the reservoir is filling. Once full, operation continues in the normal way.

If the supply in the main tank is exhausted the level in reservoir 11 will start to fall and fuel will then be supplied only through the hole 24 in tube 20 at a reduced rate. This will affect engine performance and so warn the driver, giving him time to pull up in a safe location. Assuming the main supply cannot then be conveniently replenished drum 10 will be rotated to the intermediate reserve feed position shown in FIG. 3 and a full flow of fuel permitting normal operation will then continue until the level drops below outlet 22 leaving about 10% of the total capacity remaining in reservoir 11. If a pump is on the outlet side it will draw fuel from the reservoir and air will bubble in through the inlet, if on the inlet side it will pump air in to drive the fuel out.

As a final resort the drum can then be rotated to the completely inverted reserve feed position shown by broken lines in FIG. 2 enabling further fuel to be supplied until it falls below the level of the rim of weir 23. This final reserve would enable a vehicle to be moved from a dangerous situation for example. When fully inverted this weir prevents any sediment or water lying at the lowest level of the reservoir from being extracted with the fuel.

In either the intermediate or the full reserve positions an additional advance warning of impending stoppage may be given by loss of engine performance as air is drawn through hole 24 when the fuel drops below its level.

The drum is provided with markings, conveniently raised pips or other formations which can be read by touch, to indicate its respective operating positions. When the main tank has been replenished drum 10 will be returned to the main feed position so that reservoir 11 is automatically refilled.

It is possible that tubes 19 and 20 may be wrongly connected, the device will still operate if the warning hole 24 is in the inlet, indeed such holes may be provided in both inlet and outlet tubes.

Provision may be made for remote operation of the device, for example by means of a "Bowden" cable connected for rotation of the drum. However this adds to the initial cost and may make installation more difficult.

FIG. 4 shows a device operating on the same principles, comprising a rotatable drum 30 carried on a mounting bracket 33, angular location being provided by a ball-catch 37 engaging dimples 38 as described above. This version does not include an anti-sediment weir or a warning hole in the outlet tube, and the construction is rather different in that inlet and outlet tubes 39 and 40 (or 40 and 39 for they may be connected either way) are parts of a single length of pipe secured in the bosses at each end of drum 30 and connected within reservoir 31 to extend close to the drum periphery. The wall of the pipe facing said periphery is cut away to form a single aperture 41, regions of which act as the inlet and outlet. In the main feed position (full lines in FIG. 4) this aperture is in the upper region of reservoir 31, while in the reserve feed position it will be in the lower region, e.g. fully inverted (broken lines in FIG. 4). An intermediate angular position may be provided to leave a final reserve available. Although aperture 41 is shown facing the periphery of drum 30 it can be positioned at any angle around the wall of the length of pipe. In an alternative construction (not shown) a zone of a single length of pipe may be provided with a plurality of apertures in its wall to serve as inlet and outlet apertures.

While a cylindrical and rotatable drum or container is preferred, rectangular or other shapes may be employed. It is not essential that the container itself shall be movable as the inlet and oulet tubes (or at least an outlet tube alone) may be arranged to be rotatable or otherwise movable inside a fixed container so that the inlet and outlet, or at least the outlet, can be selectively positioned in an upper or a lower region of the reservoir defined by the container. Moreover, it is not essential that the inlet and outlet be aligned so that flow from the former impinges on the latter. The inlet may be at any position relative to the outlet. Moreover the embodiments described above are believed to be the most convenient and easiest to manufacture and install, and avoid the need for fluid-tight seals between fixed structure and rotatable tubes or other parts.

While rotary movement is preferred it is contemplated that other forms of relative movement might be employed, for example an elongate container having inlet and outlet openings at opposite ends might be tilted or rocked to bring the outlet to an upper or lower region of the reservoir so defined, or an outlet tube could be in relative sliding engagement with or within a container enabling its effective height within a reservoir to be selectively varied from an upper to a lower region thereof.

A particular feature of the invention is that use of any kind of valve or change-over cock is avoided resulting in a saving in cost, and increased reliability when compared with many known forms of auxiliary fuel supply device.

I claim:

1. An auxiliary fuel supply device comprising structure defining a reservoir with an inlet and an outlet for forming an operatively enclosed connection leading from a main fuel supply to a fuel consuming device by way of the reservoir in use, and means permitting selective angular movement of at least the part of said structure which defines said outlet between a main feed position at which the outlet is positioned in an upper region of the reservoir and a reserve feed position at which said same outlet is positioned in a lower region thereof.

2. A device according to claim 1 wherein the inlet and outlet are in predetermined spaced alignment at least while said part of the structure is at the main feed position so that part of a flow of fuel leaving the inlet operatively impinges on the outlet so as to pass to the fuel consuming device while a remaining part of said flow is filling the reservoir.

3. A device according to claim 2 wherein the inlet and outlet are respective end openings of inlet and outlet tubes extending into the reservoir.

4. A device according to claim 2 wherein the inlet and outlet are regions of a common aperture in a wall of a single length of pipe, respective parts of which form inlet and outlet tubes.

5. A device according to claim 1, wherein the reservoir is defined by a container having the inlet and outlet in operatively fixed relationship, and mounted for angular movement between a main feed position and a reserve feed position.

6. A device according to claim 5 wherein the container is a drum, and mounting means is provided permitting selective angular movement of the drum about its axis.

7. A device according to claim 6 wherein said drum includes bosses on its ends which are journalled in limbs of a U-shaped bracket.

8. A device according to claim 7 wherein inlet and outlet tubes extend through at least one of the bosses.

9. A device according to claim 1 including means for retaining selectively movable parts of the structure at either of said feed positions.

10. An auxiliary fuel supply device comprising structure defining a reservoir with inlet and outlet ducts for forming an operatively enclosed connection leading from a main fuel supply to a fuel consuming device by way of the reservoir in use, said ducts having inlet and outlet openings within the reservoir in predetermined spaced alignment and communicating with an upper region of the reservoir while said outlet is located in a main feed position in an upper region of the reservoir so that part of a flow of fuel leaving the inlet operatively impinges on the outlet so as to pass to the fuel consuming device while a remaining part of said flow is filling the reservoir, and means permitting selective angular movement of at least said outlet duct from the main feed position to a reserve feed position at which the same outlet is located in a lower region of the reservoir to operatively draw fuel therefrom.

\* \* \* \* \*